(12) United States Patent
Houser

(10) Patent No.: US 8,696,876 B2
(45) Date of Patent: Apr. 15, 2014

(54) SYSTEM AND METHOD FOR GENERATING AND USING HYDROGEN GAS

(76) Inventor: Michael F. Houser, Savannah, GA (US)

( * ) Notice: Subject to any disclaimer, the term of this patent is extended or adjusted under 35 U.S.C. 154(b) by 708 days.

(21) Appl. No.: 12/592,890

(22) Filed: Dec. 4, 2009

(65) Prior Publication Data

US 2011/0132747 A1   Jun. 9, 2011

(51) Int. Cl.
*C25B 9/00* (2006.01)
*C25B 1/04* (2006.01)

(52) U.S. Cl.
USPC ............ 204/278; 204/275.1; 205/637; 123/3

(58) Field of Classification Search
USPC ................................ 204/196.02, 278; 205/637
See application file for complete search history.

(56) References Cited

U.S. PATENT DOCUMENTS

| | | | | |
|---|---|---|---|---|
| 3,915,822 A | * | 10/1975 | Veltman | 210/665 |
| 4,113,586 A | * | 9/1978 | Cook et al. | 205/574 |
| 4,169,035 A | * | 9/1979 | Stummer et al. | 204/260 |
| 6,209,493 B1 | * | 4/2001 | Ross | 123/3 |
| 2006/0102492 A1 | * | 5/2006 | Corradi et al. | 205/466 |
| 2007/0074680 A1 | * | 4/2007 | Ross | 123/1 A |
| 2009/0205971 A1 | * | 8/2009 | Pentz et al. | 205/341 |

* cited by examiner

*Primary Examiner* — Bryan D. Ripa
(74) *Attorney, Agent, or Firm* — Sonya C. Harris; Invention Services

(57) ABSTRACT

A novel electromechanical, chemical, thermal apparatus having the combined properties of a voltage intensifier, a diode and a capacitor for the molecular breakdown of water into its oxygen and hydrogen components. The instant invention uses only water (tap water, distilled water, purified water, etc.) without the need of adding any electrolyte. The system comprises a unique molecular reactor core having conductive inner and outer windings and a molecular reactor control assembly having water level controls via a float switch mechanism and temperature control process serving as the basis for the unique operation of the system. The instant invention provides a novel combination of the molecular reactor core and molecular reactor control assembly, in conjunction with a means for replenishing the water therein, all powered and controlled by simple control circuitry, and having usage implications for various functions, including but not limited to the generation of hydrogen gas.

7 Claims, 13 Drawing Sheets

SYSTEM AND METHOD FOR GENERATING AND USING HYDROGEN GAS

FIELD OF INVENTION

The present disclosure relates generally to a small electro-mechanical, chemical, thermal apparatus having the combined properties of a voltage intensifier, a diode and a capacitor used in molecular breakdown of water into its oxygen and hydrogen components.

BACKGROUND

Hydrogen generators have been known in the art wherein hydrogen is extracted from the water molecule to provide a volatile and powerful energy source. According to the American Society of Automotive Engineers, while hydrogen is a fuel, it serves primarily as a catalyst for the fuel used causing the fuel to burn very fast, completely, and reducing the carbon footprint by up to 75%. Examples of hydrogen production methods and apparatus of the prior art are described in the following documents. In U.S. Pat. No. 3,954,592 to Horvath for an Electrolysis Apparatus, old technology of an electrolysis method using pulsed current to producing magnetic and thermal reactions is discussed. U.S. Pat. No. 4,069,371 to Zito, entitled Energy Conversion, teaches of the concept of renewable energy harvesting using hydrogen. In U.S. Pat. No. 4,702,894 to Cornish for a Hydrogen Supply Unit teaches of the production of hydrogen via a thermal process including water and metals for the production of fuel. U.S. Pat. No. 7,241,522 to Moulthrop for a Regenerative Electrochemical Cell System and Method for Use Thereof is prior art that teaches of an hydrogen on demand device using water employing an electrolyzer component. U.S. Pat. No. 20080047502 to Morse for a Hybrid Cycle Electrolysis Power System with Hydrogen & Oxygen Energy Storage, teaches of decompressing hydrogen and oxygen isentropically using internal combustion to generate power. The U.S. Pat. No. 4,023,545, issued on May 17, 1977 to Moshe et al, as well as the U.S. Pat. No. 6,209,493, issued to Ross on Apr. 3, 2001, both provide teachings of "on-board" hydrogen gas generating systems for use with internal combustion engines, to afford hydrogen gas as a fuel source for combustion engines. However, in alignment with all of the prior art, such units also utilize electrolytes.

SUMMARY

The method and system according to the present invention offer a practical process and a safe device for use by the general public, and beyond, which has the combined properties of voltage intensifier, diode and capacitor characteristics. The method and system of the instant invention may be used for various uses, including, but not limited to, the production of hydrogen gas.

In the prior hydrogen generation systems, large quantities of an electrolyte (in portions as high as 25% of the aqueous solution) and excessive electrical energy requirements have been employed. Most of the energy used results in thermal losses thus requiring dissipation through extraneous equipment and devices. This produces handling and safety, and even corrosion issues. Furthermore, hydrogen generation devices are large, bulky, costly to manufacture and not easily adapted for use in vehicles or other machinery, as a fuel supplement and/or catalyst.

It is well known that significant effort has been spent in trying to efficiently produce hydrogen gas. Much of the focus has primarily been in the electronic field where the approach has been to attempt to develop complex and sophisticated electronic solutions, requiring large amounts of electrical energy, of which none have been particularly noteworthy. In the prior art, thermal losses are also viewed as a wasted by-product of the production of hydrogen. In many hydrogen generation systems, heat removal and/or recovery devices have been employed in attempt and increase the efficiency, or to remove the heat produced by the process.

In accordance with a first aspect of the present invention, there is disclosed a unique, and compact molecular reactor system which is an electromechanical, chemical, thermal apparatus having the combined properties of a voltage intensifier, a diode and a capacitor (shown to hold electric charge as a capacitor in that electric current flows only in one direction, after polarization, as a diode).

In accordance with a second aspect of the present invention, there is disclosed a simple, low cost system and method for producing hydrogen gas with materials that are easily accessible and utilizing a very simple design.

In accordance with another aspect of the present invention, there is disclosed an efficient system and method for producing hydrogen gas not requiring any addition of electrolytes and employing the use of ordinary tap water.

In accordance with yet another aspect of the present invention, there is disclosed a simple low cost and efficient system that requires a simple energy source such as simple 12V DC and produces electrical energy in excess of 15 kV.

In accordance with yet another aspect of the present invention, there is disclosed a low cost and efficient system utilizing simple electronic controls employing a modified direct current motor control with access to modulating pulse width, frequencies, voltage and amperage of the system.

In accordance with a first aspect of the present invention, there is disclosed a method for disassociating water into hydrogen and oxygen components while employing a molecular reactor core and control components being comprised of accessible and inexpensive materials.

In accordance with yet another aspect of the present invention, there is disclosed a low cost and efficient system utilizing a molecular reactor and core control which necessarily concentrates a large amount of energy into a small dimensional package and produces unique electro-thermal-chemical forces therein, which when combined with ordinary tap water, breaks the water into its oxygen and hydrogen components using relatively low power (amperage) requirements.

In accordance with yet another aspect of the present invention, there is disclosed a low cost and efficient system and method for producing hydrogen gas void of the standard plates and electrodes of the prior art but rather making use of a unique molecular reactor core design having a production emphasis on the mechanical controls more so than the electrical controls.

These and other advantages of the invention will become more apparent after reading the description and claims which follow.

BRIEF DESCRIPTION OF THE DRAWINGS

Throughout the following views, reference numerals will be used on the drawings, and the same reference numerals will be used throughout the several views and in the description to indicate same or like parts of the invention. Embodiments of the present disclosure are described herein with reference to the drawings, in which.

DETAILED DESCRIPTION

Hydrogen generators produce hydrogen and oxygen through the electrolysis of water, following the general chemical equation:

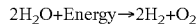

$$2H_2O + Energy \rightarrow 2H_2 + O_2$$

This chemical transformation describes the general process of electrochemical separation of water molecules into its two components, namely Oxygen and Hydrogen ($O_2$ and $H_2$). In an electrolysis system, these two gases are emitted from the electrodes and are separated and may be captured for use as an energy source for any one of many hydrogen powered appliances, devices, vehicles, or machines that can use such fuel sources.

Figure 1:
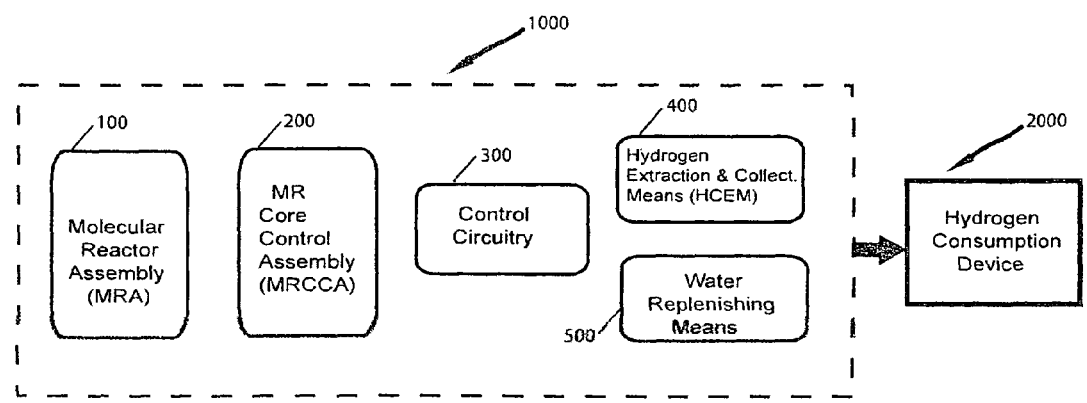
FIG. 1 is a diagram illustrating a block diagrammatic overview of illustrating the operation of the disclosed system, according to certain embodiments of the present invention.

In the instant invention, a novel system and method for the generation of hydrogen gas is disclosed. FIG. 1 is a diagrammatic illustration of a novel means for producing hydrogen gas in accordance with a particular embodiment of the present invention. In one embodiment the major components for a hydrogen generation system 1000 may comprise a Molecular Reactor Assembly (MRA) 100 operatively coupled to a Molecular Reactor Core Control Assembly (MRCCA) 200, control circuitry 300, a Hydrogen Extraction and Collection Means (HECM) 400 and a water replenishing means 500. The hydrogen that has been generated may then be harvested and used as a fuel source for powering any number of possible Hydrogen Consumption Devices (HCD) 2000. In some embodiments, the HCD 2000 may be operatively coupled to the hydrogen generation system 1000, as discussed below; however, in alternate embodiments, the hydrogen gas may be extracted and stored for various subsequent, and even portable fuel usages depending on the appliances, devices, vehicles, and/or type of machinery.

Figure 2:
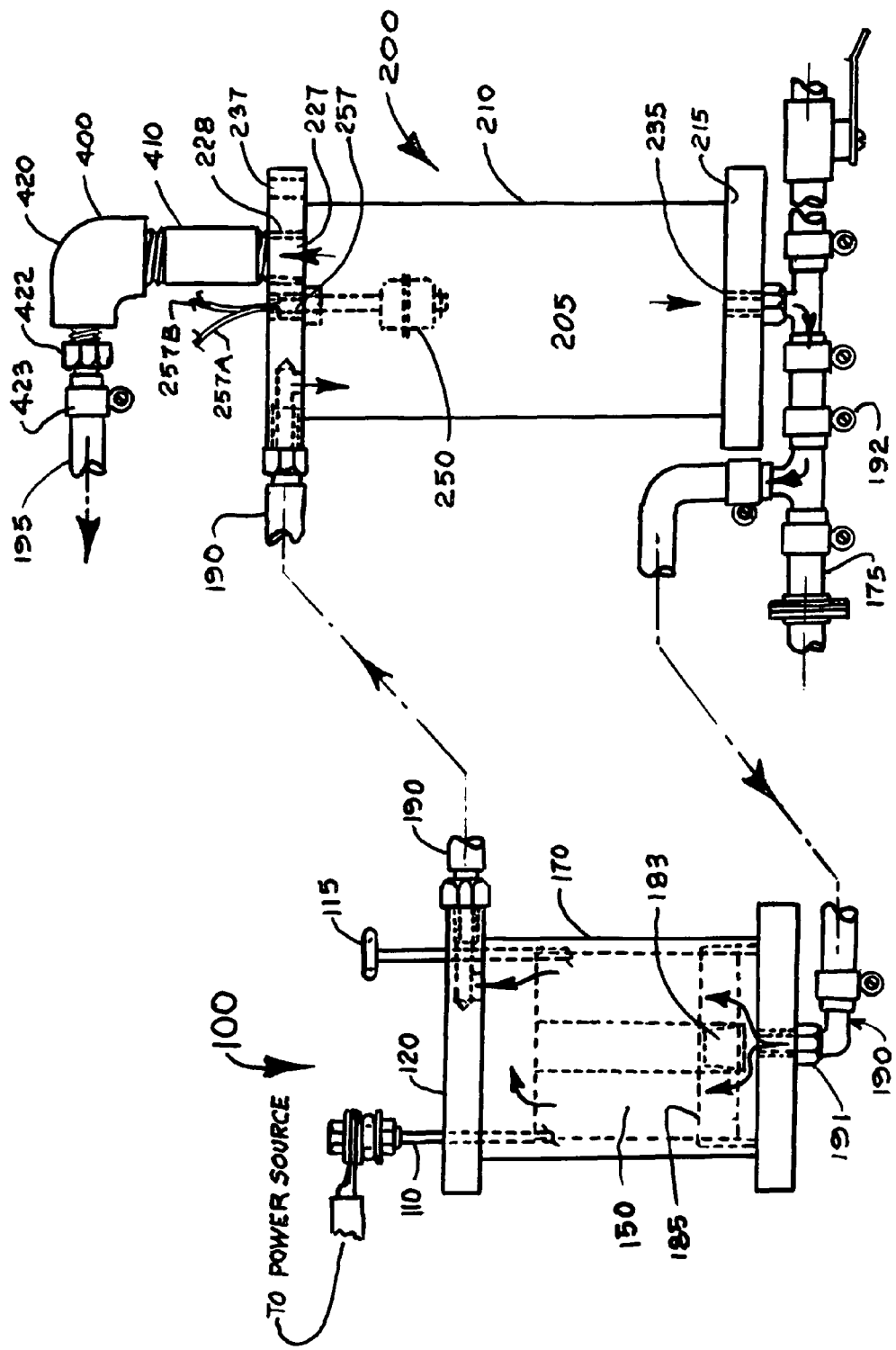
FIG. 2 is a diagram illustrating a Molecular Reactor Assembly (MRA) operatively coupled to a Molecular Reactor Core Control Assembly (MRCCA), according to certain embodiments of the present invention.

FIG. 2 is a schematic diagram illustrating the operative coupling between the MRA 100 and the MRCCA 200. The MRA 100 is comprised of reactive components and elements that create the conditions conducive for generating hydrogen gas. The MRA 100 and the MRCCA 200 operate in symbiotic relationship with one another wherein the MRA 100 serves as the reactive center for the electrical and thermal processes to transform the tap water (essentially $H_2O$) into its components of oxygen and hydrogen.

The MRCCA 200 is an auxiliary component having a cooperative relationship to the MRA 100 to facilitate cooling and recirculation of the liquids in both units. It is driven by the rising gas bubbles and temperature produced by the MRA 100. In operation, tap water contained in the MRA 100 is heated and produces an array of gas bubbles that drives the operation of the MRCCA 200 via recirculation, as indicated by the arrows of FIG. 2. The amount of recirculation, and hence cooling, is dependent on the water level in the MRCCA 200. An assortment of fluid flow conduit means (FFCM) (described further below) and associated parts serve as a conduit for providing flow of water, steam, gases, and foam derived from the thermal, electrical and chemical reactions between the MRA 100 and the MRCCA 200, thus maintaining the symbiotic relationship between the two units.

It also serves as a settling chamber allowing water and condensate to flow out and cycle back to the MRA 100. Portions of the FFCM 190 is elevated (for example, as much as 3 inches in one embodiment) to accommodate any rise of water by creating a slight water column head pressure, which by design will always be greater than any pressure possibly generated by the hydrogen production process. This is beneficial for eliminating any back wash of water into a hydrogen consumption device, e.g., such as an automobile engine. This provides a safety feature that prevents sloshing in any sort of rough movement situation.

Figure 3:
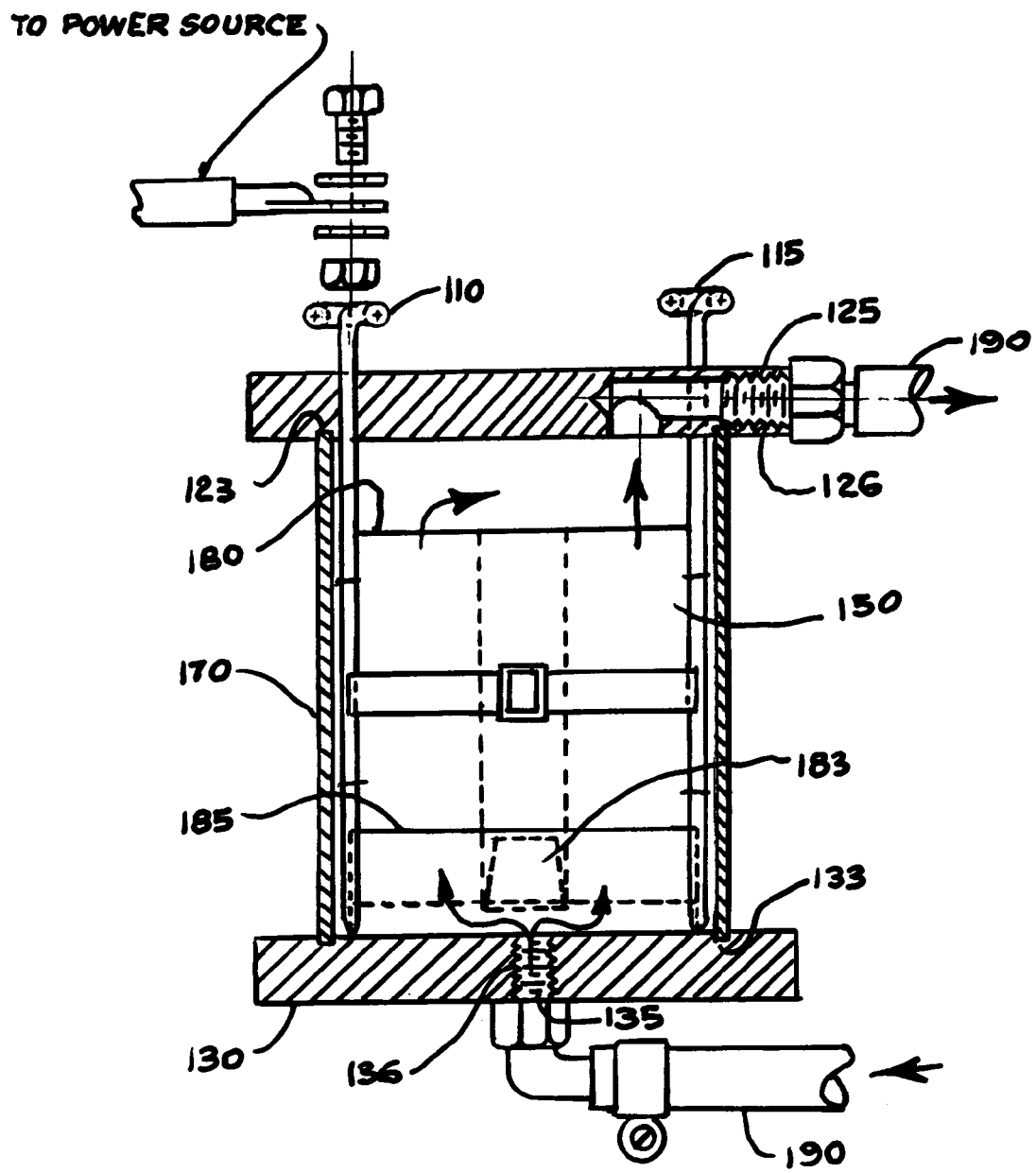
FIG. 3 is a plan view illustration of the MRA, according to certain embodiments of the present invention.
Figure 4:
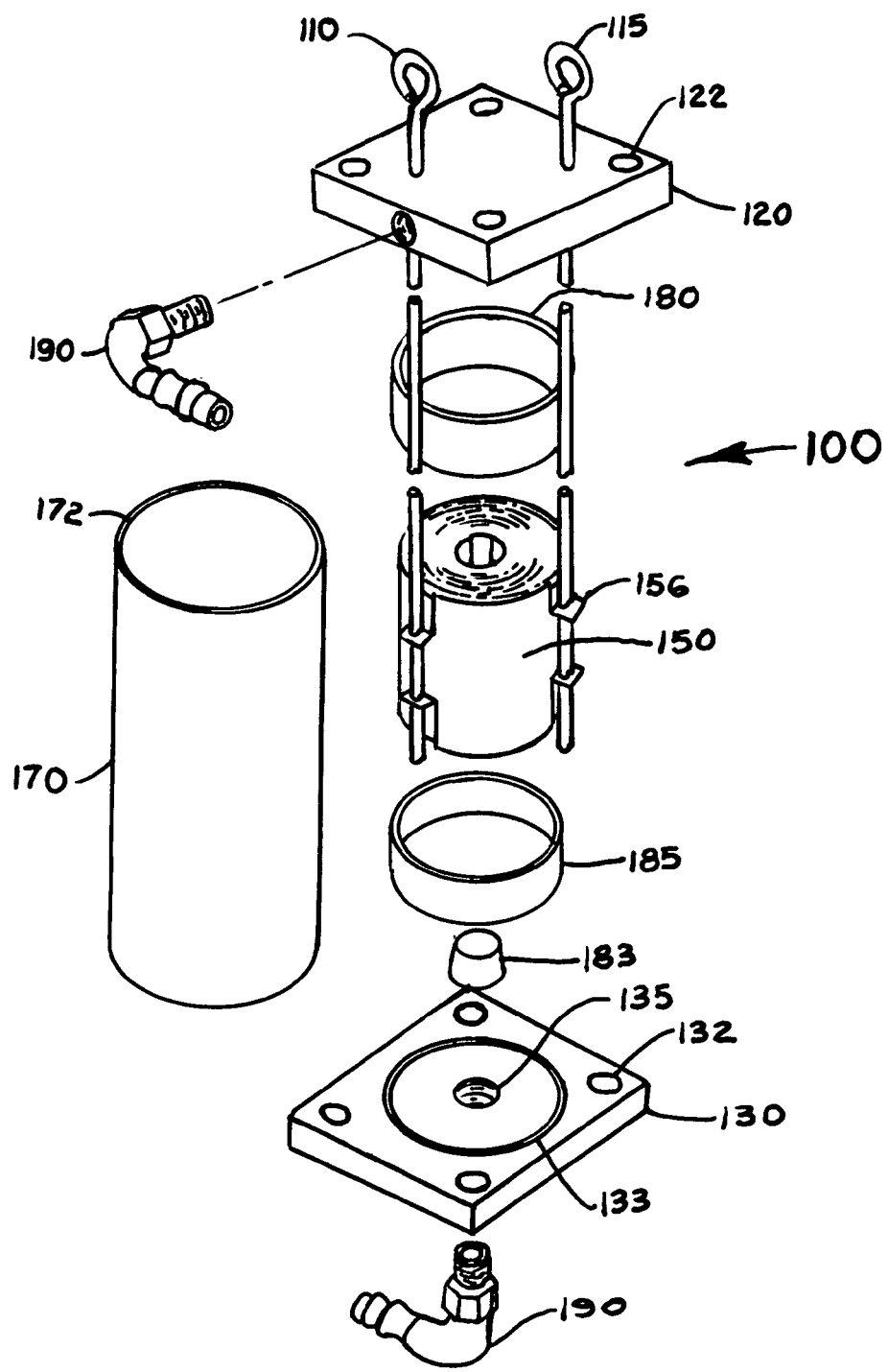
FIG. 4 is an exploded perspective view of the MRA, according to certain embodiments of the present invention.

FIGS. 3 and 4 illustrate the MRA 100 in further detail. FIG. 3 is a plan view diagram of the MRA 100 and FIG. 4 provides an exploded perspective illustration of the MRA 100. At the seat of the MRA 100 is the reactor core 150. The reactor core 150 is comprised of a set of closely wrapped continuous spiral wound conductors hereinafter dubbed the Outer and Inner Reactor Core Conductors (RCC's) 153 and 155, respectively, discussed in further detail below with regard to FIGS. 5 and 6. These RCC's 153 and 155 are wound about one another as anode and cathode and successively connected to a set of electrical conductors serving as contact electrodes 110 and 115 and having a spatial relationship to one another such that they are continuous and concentrically wound about one another and closely wrapped and insulated from one another. The contact electrodes 110 and 115 are comprised of suitable electrically conductive materials such as copper.

The reactor core 150 is encased in a nonconductive core container 170. The core container 170 may be comprised of any suitable nonconductive, heat resistant and mechanically rigid materials, such as, for example, polycarbonate tubing.

However, in some embodiments, the core container 170 may be comprised of materials such as stainless steel. In one embodiment, the MRA 100 has dimensions comprising a height of approximately 6.25 inches and a width of approximately 3 inches. It is important to note that one important feature of this instant invention is the relative small size. The relative dimensions of the wound RCC's 153 and 155, the core container will become further apparent with subsequent description below.

The core container 170 provides a hermetic sealing for the MRA 100 and any fluid contained therein, and is sealed at either end by a set of proximal and distal core end plates 120 and 130, respectively. Both the proximal and distal core end plates 120 and 130 may contain recesses, grooves, tapping, and/or coring, 123 and 133 (note FIG. 4) for forming the sealed fitting at the juncture between the core plates 120 and 130 and the core container 170.

A set of proximal and distal core container skirts 180 and 185, respectively, immediately surround the body of the molecular reactor core 150 to facilitate the desired direction of fluid flow thereabout, as illustrated by the set of arrows in FIG. 2. Moreover, an inner core plug 183, which serves to prevent recirculation of fluid within the inner most interior portion of the MRA 100, and works in conjunction with a set of proximal and distal core container skirts 180 and 185. The inner core plug 183 is comprised of a suitable form fitting, heat resistant and non-conductive material such as PVC, acrylic, nylon, and the like.

The set of proximal and distal core container skirts 180 and 185 are concentrically located within the core container 170 and thereby the diameter is smaller than the core container 170 but larger than the body of the reactor core 150, and fitting tightly thereabout. In one embodiment, the dimension of the core container 170 has a diameter in the range of about 2-3 inches. The reactor core 150 is designed to be as small as possible, requiring minimal, but precise, amounts of material for optimal operation. {Further dimension relationship disclosure here based on measurements}

Figure 5:
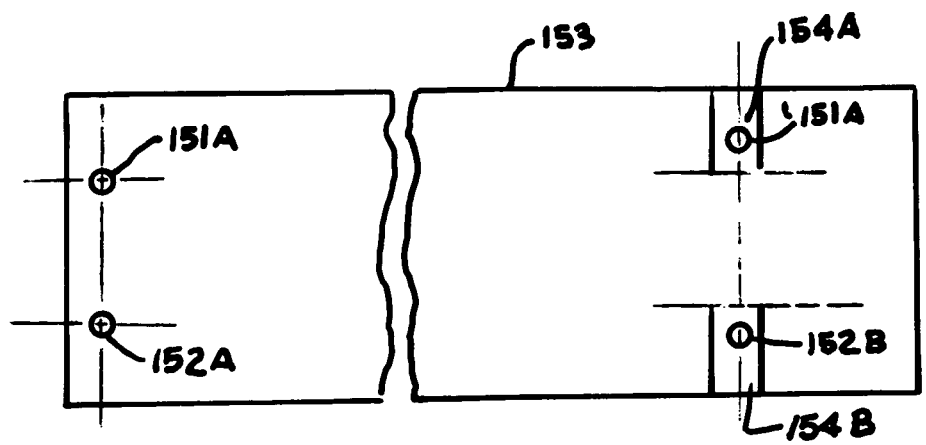
FIG. 5 is a plan view diagram of the Outer Reactor Conductor Core (Outer RCC), according to certain embodiments of the present invention.
Figure 6:
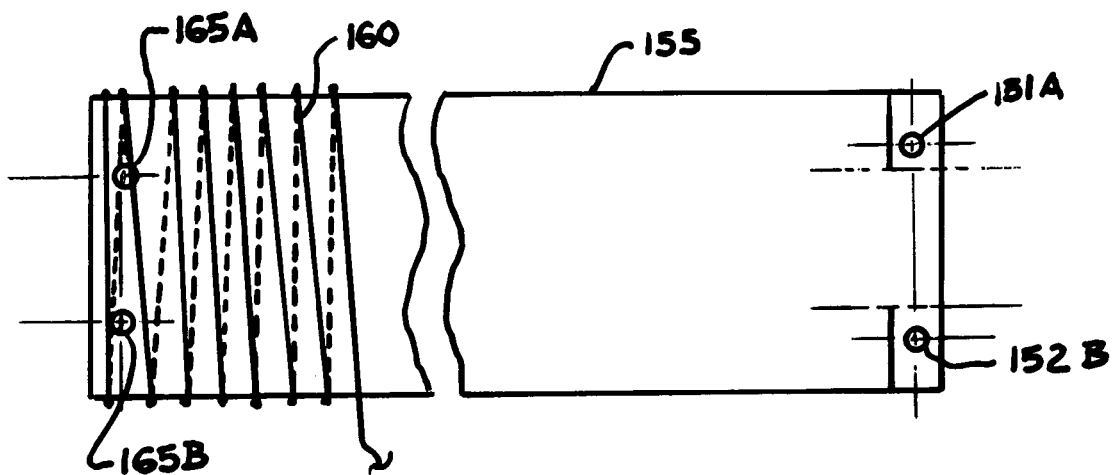
FIG. 6 is a plan view diagram of the Inner Reactor Conductor Core (Inner RCC), according to certain embodiments of the present invention.
Figure 7:
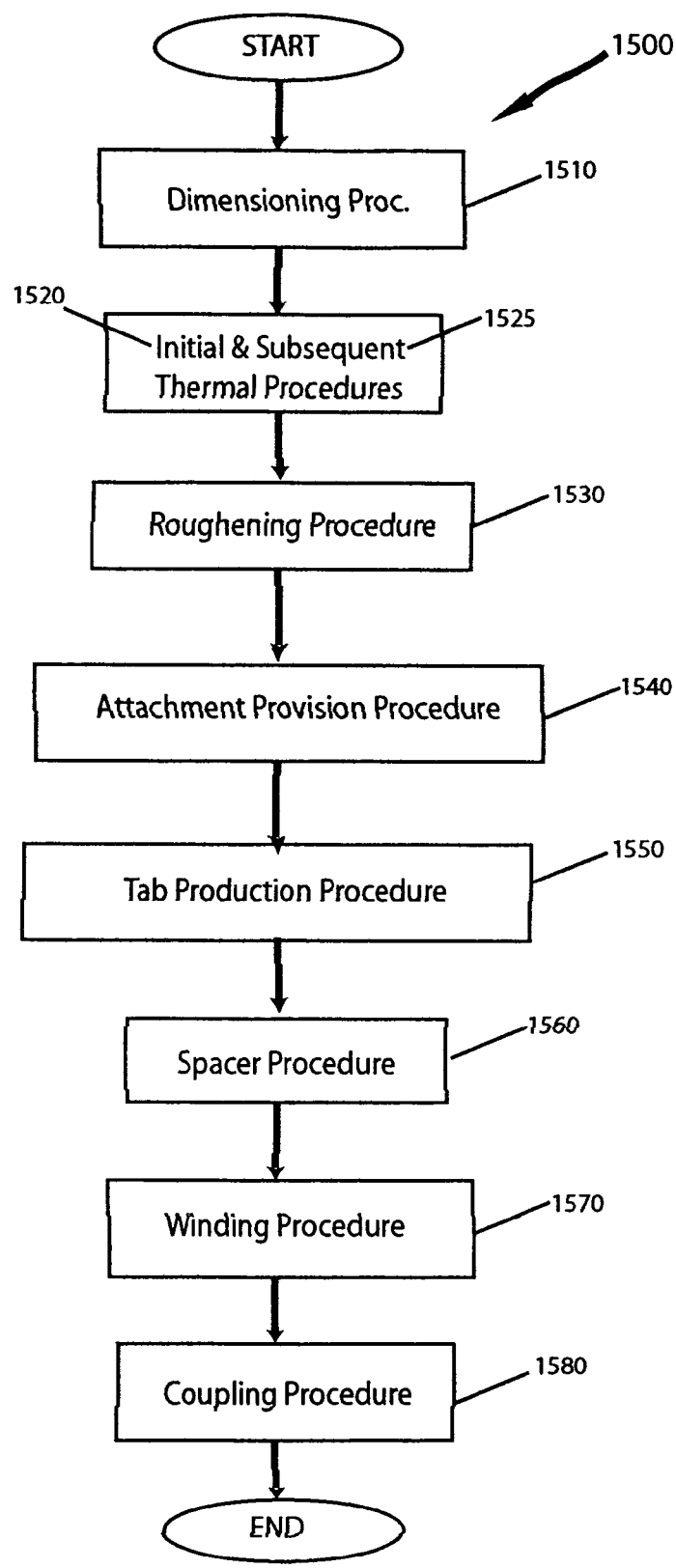
FIG. 7 is a flow diagram illustrating an embodiment of method steps for preparing the Inner and Outer RCC's, according to certain embodiments of the present invention.

Referring now to FIGS. 5 and 6, the outer and inner RCC's 153 and 155 are illustrated in their pre-wound state. Prior to winding the metal sheets about one another to thus form a cathode and anode configuration (and moreover, the body of the reactor core 150) sheets of conductive material are prepared. Additionally, FIG. 7 is a flow diagram illustrating an embodiment of method steps for preparing the reactor core conductors 153 and 155 which include a series of RCC production procedures 1500.

In the dimensioning procedure 1510, a set of conductive plates are provided and dimensioned. In one embodiment, this procedure comprises providing two 316L grade stainless steel plates having an approximate length ranging between 24-30 inches and a width ranging between 2-5 inches, thus, the plates may have an approximate surface area of 81 inches per side, in one embodiment.

In this embodiment, 316L grade stainless steel is chosen as a conductive material because of its high corrosive resistant characteristics and superior malleability. Furthermore, grade 316L has a low carbon content and is immune from sensitisation (grain boundary carbide precipitation).

The chemical formula is:

Fe,<0.03% C,16-18.5% Cr,10-14% Ni,2-3% Mo,<2% Mn,<1% Si,<0.045% P,<0.03% S

The tensile strength is approximately 485 (MPa)

| Table of Physical Properties for 316 grade Stainless Steels | | | | | | | | |
|---|---|---|---|---|---|---|---|---|
| | | | Mean Co-eff of Thermal Expansion ($\mu$m/m/° C.) | | | Thermal Conductivity (W/m·K) | | Specific Heat | Elec Resistivity |
| Grade | Density (kg/m$^3$) | Elastic Modulus (GPa) | 0-100° C. | 0-315° C. | 0-538° C. | At 100° C. | At 500° C. | 0-100° C. (J/kg·K) | ($n\Omega \cdot m$) |
| 316/L/H | 8000 | 193 | 15.9 | 16.2 | 17.5 | 16.3 | 21.5 | 500 | 740 |

Source: Atlas Steels Australia

The stainless steel plates provided may be approximately 0.01 to 0.025 inches thick. Although 316L grade stainless steel is described herein as a conductive material used to comprise the RCC's 153 and 155, it would be further evident to one skilled in the art to use other suitable conductive materials in lieu of stainless steel for the conductors.

Referring again to FIG. 7, a further step in the process of preparing the reactor core conductors includes a multi-step thermal process. In an initial thermal step 1520, the steel plates are heated to a temperature of about 450 degrees for approximately 4 hours. And, in a subsequent thermal step 1525, the steel plates are cooled to room temperature for approximately 2 hours.

Additionally, in a roughening procedure 1530, an abrasive element, such as sandpaper, is used to abrade either side of the steel plates. This procedure facilitates gas bubble formation by providing a roughened surface area on the plates within the MRA 100 during the hydrogen generation process. It is also envisioned that this procedure facilitates suitable conditions for producing the necessary molecular electrochemical changes in the steel plates and thus contributing to the unique performance of the MRA 100.

FIGS. 5 and 6 provide illustrations indicating the result of the procedure of providing attachment means 1540. Herein, sets of hook apertures 151a and 152b are formed in the RCC's 153 and 155 at the proximal and distal ends of the steel plates. In a tab production procedure 1550, tabs 156 are formed on one portion of the plates by producing an array of longitudinal slits, and then cutting and extracting the excess plate material.

The formed tab 156 constitute the connection portion of the RCC's 153 and 155 and are bent to an angle θ, which can range from about 30-60 degrees, with respect to the normal plane of the pre-wound steel plate. This angled tab 156 provides a pinch fitting for receiving, and thus electrically coupling with the contact electrodes 110 and 115 (as illustrated in FIG. 9).

In a spacer procedure 1560, nonconductive spacer material 160 is coupled to the inner reactor core conductor 155 to prohibit each of the RCC's 153 and 155 from touching one another once they are wound about one another. FIG. 6 shows the set of anchor apertures 165a and 165b for connecting the spacer material 160 to the reactor core conductor 155. In one embodiment, a monofilament, a monofilament line or an approximate diameter ranging from 0.030 to 0.035 inches in diameter is wrapped about both sides of the inner RCC 155 from a distal end to the proximal end thereof.

Figure 8:
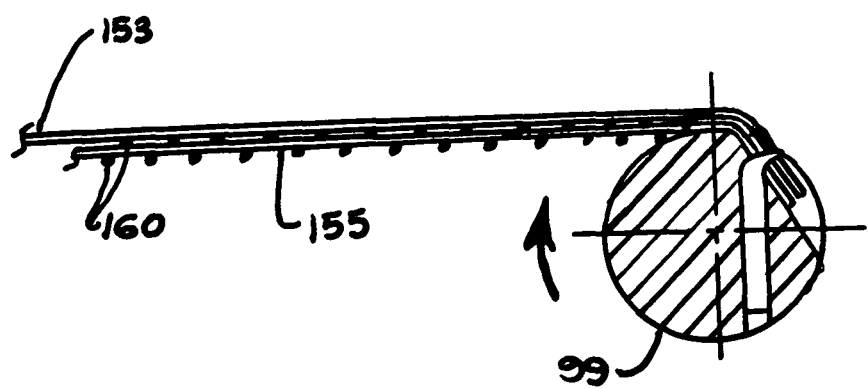
FIG. 8 is a perspective illustration of the winding of the Inner and Outer RCC's, in accordance with an embodiment of the present invention.

In a winding procedure 1570, the reactor core conductors 153 and 155 are kept electrically insulated from one another via the spacer material 160, but are wound about one another by any suitable wrapping tool 99 (e.g., a wrap mandrel, or the like) as illustrated in FIG. 8. This winding procedure 1570 facilitates the polarity of the RCC's 153 and 155 and prepares them for operating with anodal and cathodal electrical characteristics once electrically connected to a power source via contact electrodes 110 and 115.

Figure 9:
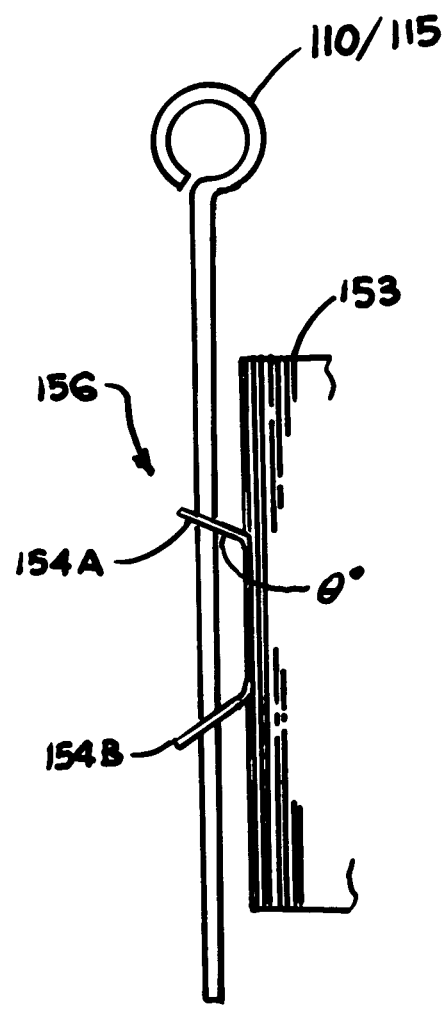
FIG. 9 is a side view illustrating electrical coupling of the electrical connectors to a RCC, according to one embodiment of the present invention.

In an electrical coupling procedure 1580, the distal ends of the RCC's 153 and 155 are bent at the tabs 156 and electrically coupled to electrical conductors 110 and 115, see FIG. 9. Moreover, illustrates a top diagrammatic view of the MRA 100 wherein the relationship of the wound RCC's 153 and 155 and connection to contact electrodes 110 and 115 may be gleaned.

Figure 10:
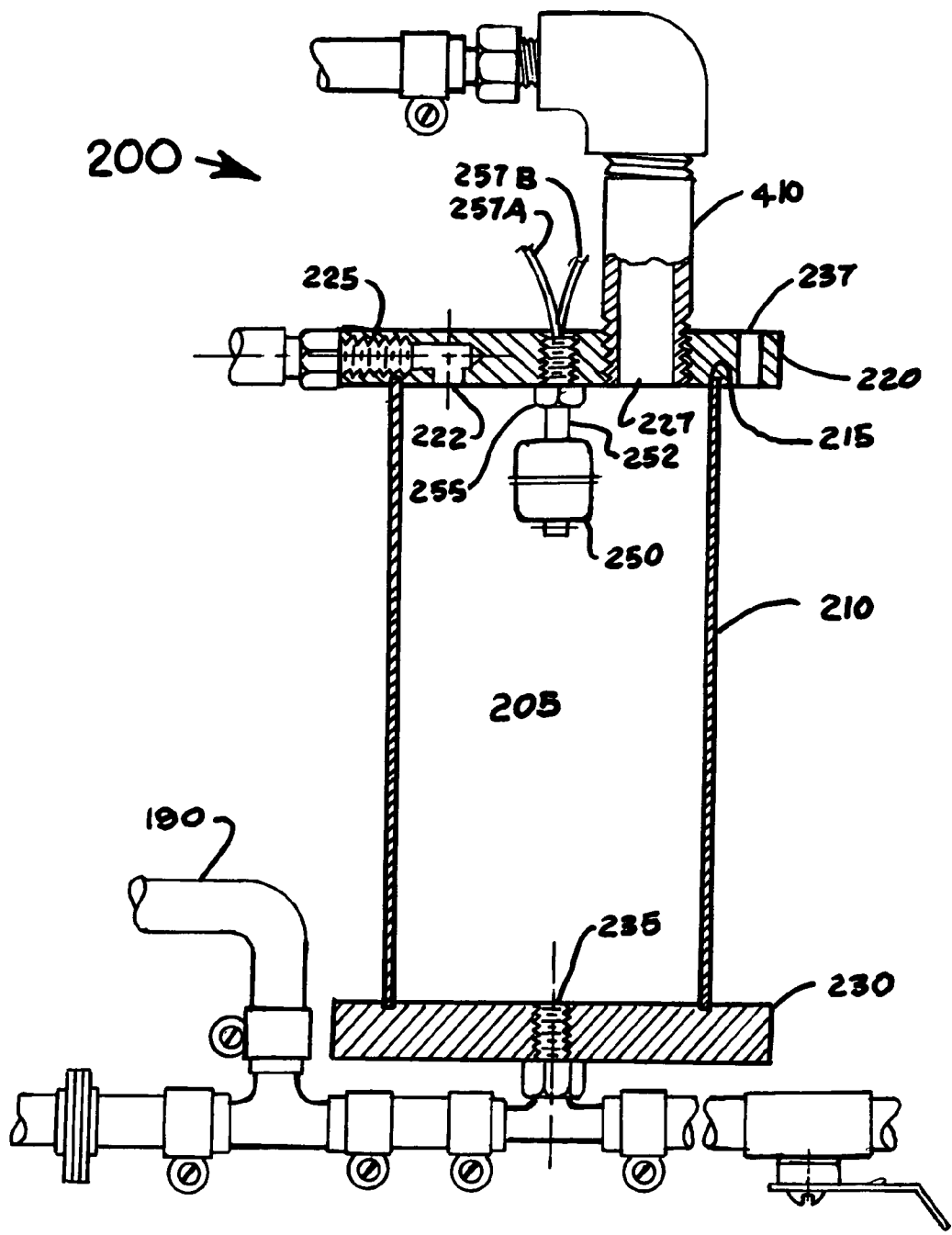
FIG. 10 is plan view diagramming the MRCCA, according to certain embodiments of the present invention.
Figure 11:
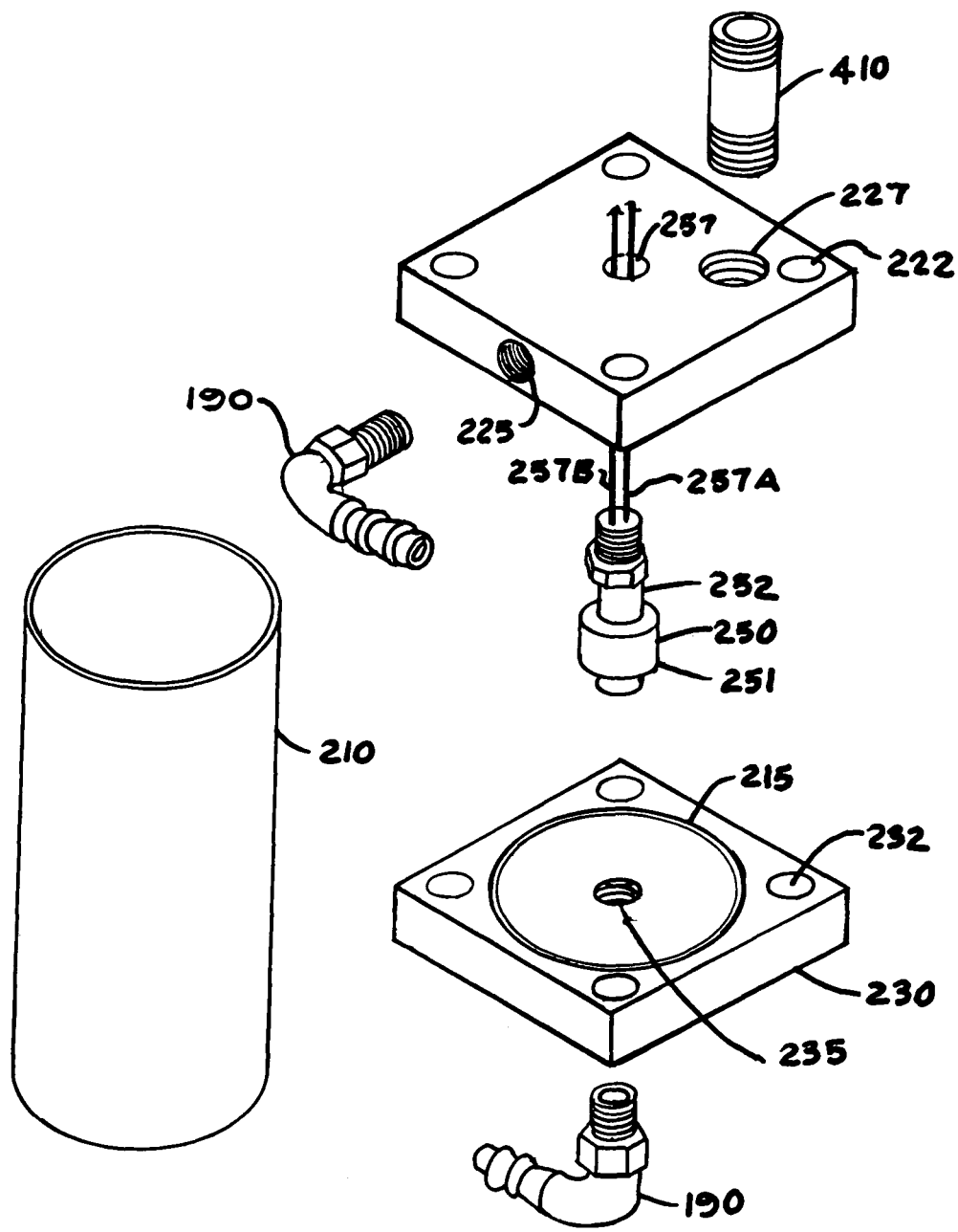
FIG. 11 is a diagram illustrating an exploded perspective view of the MRCCA, according to certain embodiments of the present invention.

An embodiment of the MRCCA 200 is illustrated in FIGS. 10 and 11. The body of the MRCCA 200 is comprised of a body casing 210, which may be comprised of any suitable nonconductive, heat resistant and mechanically rigid materials, such as, for example, polycarbonate tubing. However, some embodiments may employ stainless steel. The body casing 210 may have a cylindrical shape. Body casing 210 provides a housing for fluid and a float switch mechanism (FSM) 250 for containment therein. The MRCCA 200 serves as an auxiliary unit separate from the MRA 100 and is governed by design principals of basic cooling and recirculation of liquids.

As can be gleaned in the illustration of FIG. 2, it is driven by rising gas bubbles and temperature, and thus requiring no further power source. This simplistic design of fluid pressure controls the water level in both the MRA 100 and MRCCA 200.

The body casing 210 provides a hermitic sealing for the MRCCA 200 and is sealed at either end by a set of proximal and distal end plates 220 and 230, respectively. Each of the proximal and distal end plates 220 and 230 may contain a recess, groove, tapping, and/or coring, 215 (note also FIG. 10) for forming the sealed fitting at the juncture between the proximal and distal end plates 220 and 230 and the proximal and distal ends of the core container 170. The proximal and distal end plates 220 and 230 may further contain a set of threaded apertures 225, 235 and 227, for threadably receiving and thus providing mechanical coupling to a set of FFCM 190, as well as a hydrogen outlet tubing hydrogen outlet and collection tubing 410.

The hydrogen gas outlet tubing hydrogen outlet and collection tubing 410 provides a conduit for the escaping hydrogen gas that has been generated by the MRA 100 such that it may be extracted and adapted for use by a HCD 2000. The FFCM 190 may comprise an array of tubing 195 of varying shapes and dimensions, nuts 191, bolts 192, clamp assemblies 198 and connector tubing 193 operatively connected to one another for providing sealed, longitudinal passageways for fluids in and out of the MRA 100 and MRCCA 200.

The amount of recirculation, and hence cooling, is dependent upon the water level in the MRA 100 and the associated temperature generated by the reactions occurring within the MRA 100. The higher the water level in relation to the gas outlet tubing hydrogen outlet and collection tubing 410, the more fluid flows (gas, foam, and/or water) and heat exits the MRA 100 accordingly. The lower the water level, the less heat and fluid flow and out of the MRA 100 and into the MRCCA 200.

In that it is desirable to maintain a heat of just below about 212 degrees F. (at sea level), the water level requires constant adjusting to maintain a run level such that when this optimal temperature is reached, or exceeded, fluid (gas, water and/or foam) and produced heat is removed to stabilize the system to the desired operating temperature. The desired water level in the MRA 100 is maintained and adjusted via raising or lowering the height (i.e., x-plane spatial relationship) of MRCCA 200 relative to the MRA 100.

Moreover, the MRCCA 200 also cools the ejected water by surface radiation and air flow and thus facilitating the water flow which proceeds down through the plumbing of the FFCM 190 and is returned to the exit aperture 125 of the MRA 100 where upward normal forces pull the water up through the body of the MRA 100 by the newly formed hydrogen gas bubbles (again note arrows of FIG. 2). This fluid flow is a continuous process which can be controlled by the water replenishing means 500. It is noted that this embodiment does not produce excessive heat that needs to be removed by radical means.

Figure 13:
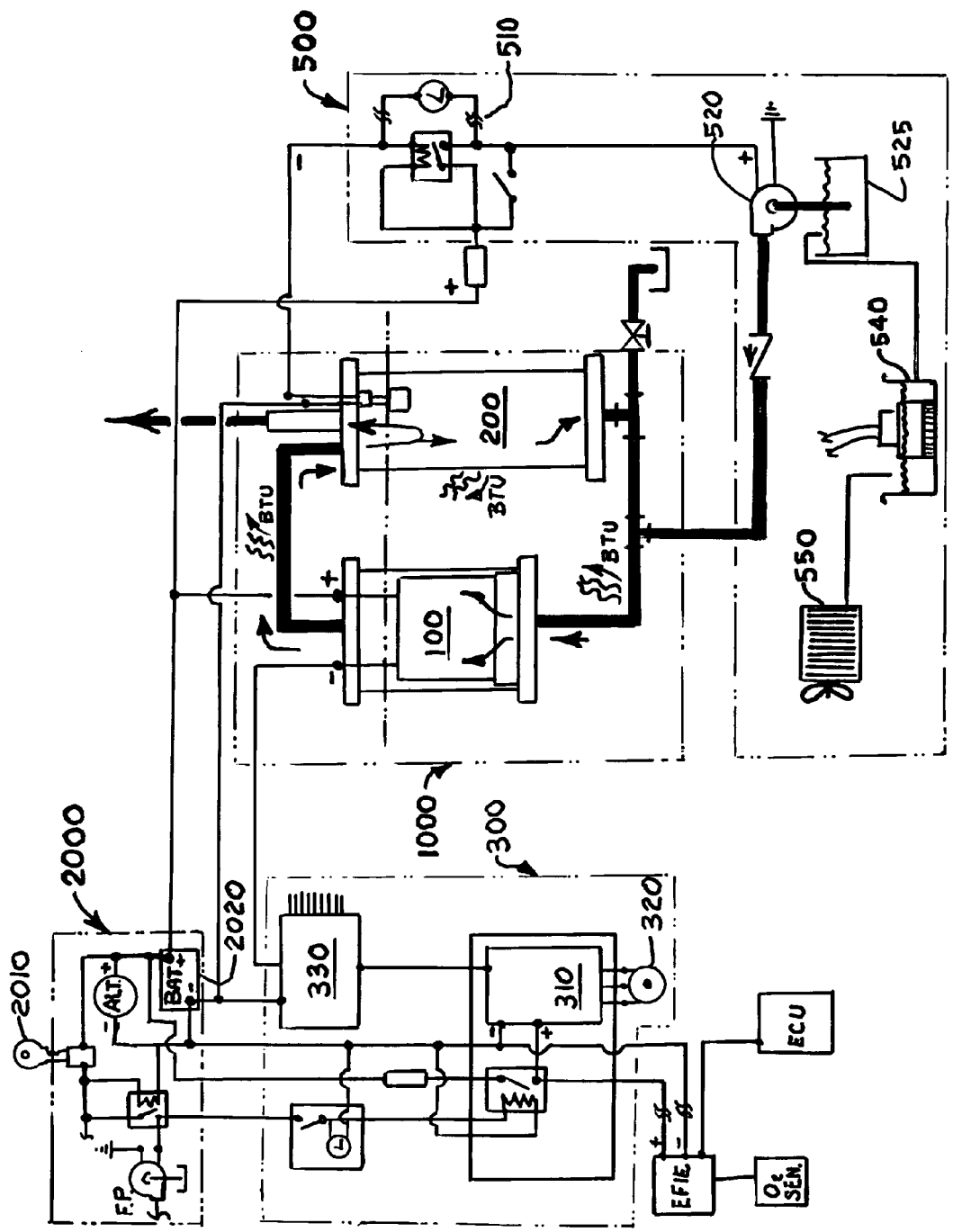
FIG. 13 is a partially block, schematic systems diagram illustrating one embodiment of the hydrogen generation system adapted for fuel usage via a hydrogen consumption device, according to one embodiment of the present invention.

As seen diagrammatically in FIG. 13, the control circuitry 300 includes a throttle means 320 which may be adjusted to control the rate of the hydrogen gas production. For example, the throttle means 320 comprises a potentiometer with and adjustable output which may be reduced, thus lowering the delivered power to the system and hence, less hydrogen is produced.

The FSM 250 is housed within the MRCCA 200 and is comprised of a float 251 which may be comprised of suitable, water resistant conductive material, such as, stainless steel. The float 251 comprises a coupling section 252 for coupling to the proximal end plate 220. The proximal end plate 220 comprises an aperture 257 which may contain threading 253 for coupling to the MRCCA 200 by connection means such as a bolt 255. A set of conductors 258a and 258b serve to electrically couple the float 251 to control circuitry 300, and particularly a float control switch (FCS) 510 (FIG. 12) for controlling the make up feed water within the MRCCA 200. The FSM 250 operates by way of floatation upon the water surface contained within the MRCAA 200, as described further below.

Figure 12:
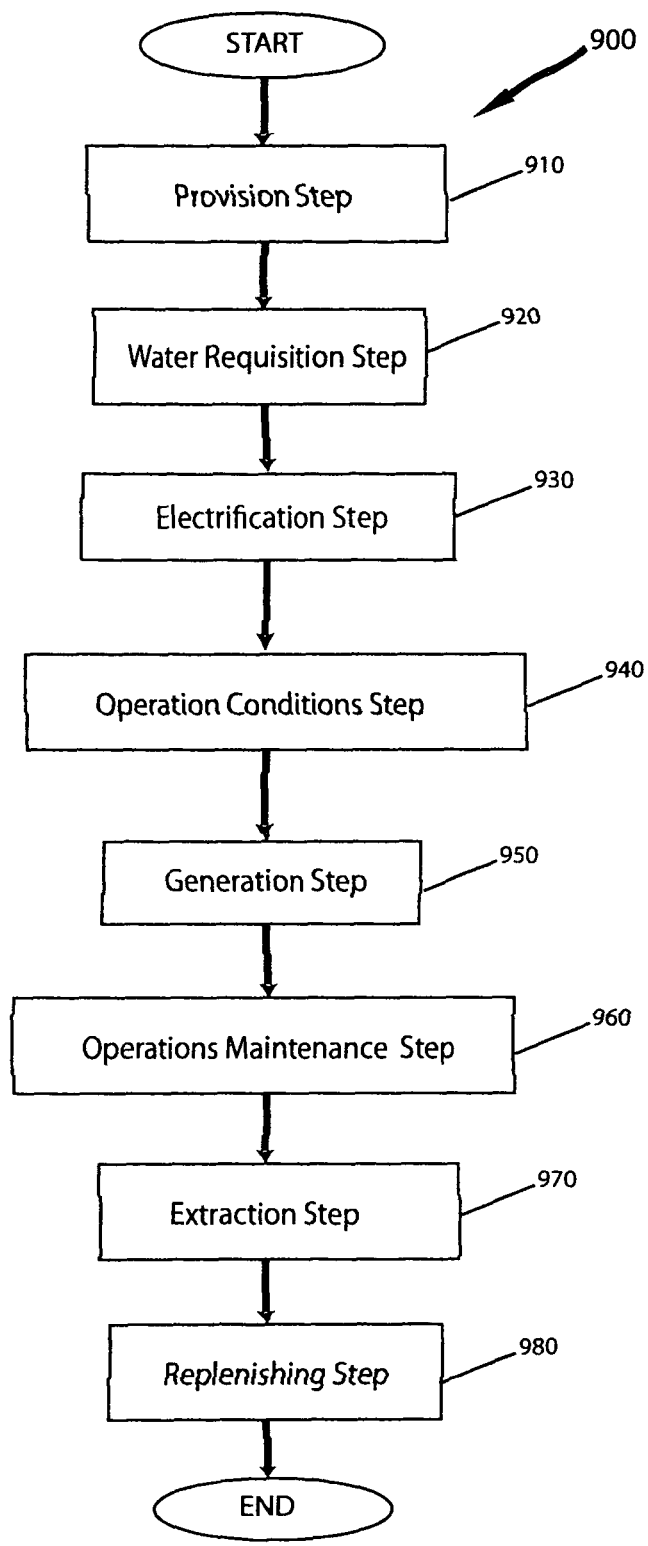
FIG. 12 is a flow diagram indicating the production of hydrogen gas in accordance with an embodiment of the invention.

FIG. 12 illustrates a general flow chart of one loop of the hydrogen gas generation process 900, in accordance with an embodiment of the present invention. In an initial provision step 910, a hydrogen gas generation system 1000 in accordance with the disclosed description is provided comprising a MRA 100, MRCCA 200, control circuitry 300, HCEM 400, and water replenishing means 500. In a water requisition step 920, non-electrolytic water (e.g., tap water, distilled water, purified water, or fresh water) is added to the MRA 100. In an electrification step 930, power is supplied to the hydrogen generation system 1000 by way of the control circuitry 300, which comprises a power source, such as a 12V DC battery. This powering provides the necessary electron flow through the wound RCC's 153 and 155 and thus beginning the process of the heat generation, water level oscillations, and bubble formation of the system 1000.

In an operation conditions step 940, optimal thermal and electrochemical operating conditions have to be met. This step includes allowing the power settings to achieve the desired, predetermined set point, which in turn allows the temperature to rise within the MRA 100 to just below boiling (to approximately 212 degrees F.). This occurs when the amperage rises to the predetermined set point and maximum current is flowing through the RCC's 153 and 155. The relative large surface area of both the RCC's 153 and 155 contribute to the large resisitive characteristics of the stainless steel plates. In one embodiment, a power setting can be in the range of 20-25 amps. It is to be understood that it is well within the scope of the invention to adjust power setting (amperage and/or voltage) to suit the needs and condition requirements of the hydrogen consumption device 2000 being used.

In a generation step 950, the hydrogen gas is generated. Once the optimal operating conditions are met, both hydrogen ($H_2$) and oxygen ($O_2$) gases are produced as a byproduct of the pulse width, frequency and current adjustment and electrochemical processes occurring within the MRA 100 in conjunction with the controlling functions of the MRCCA 200.

In an operations maintenance step 960, optimal thermal and electrochemical systems operating conditions have to be maintained. Therefore, the temperature, water levels and power settings must be kept at predetermined levels to maintain continuous hydrogen production. The power setting is maintained at a level to consistently allow the temperature to stay just below the boiling range. The temperature is maintained at optimal temperatures by also adjusting the water levels in the MRA 100. As these parameters are maintained, the hydrogen gas is efficiently and consistently produced.

In an extraction step 970, the generated hydrogen gas is extracted and collected via HCEM 400. The hydrogen gas, resulting from the above processes, rises to the top of the MRA 100 exiting the hydrogen exit aperture 227 and enters the hydrogen outlet and collection tubing 410.

In a replenishing step 980, the necessary water level within the HGS 1000 is maintained by systematically replenishing non-electrolyzed water. This may be done automatically with the aide of the control circuitry 300. For example, in one embodiment, the FCS 510 signals the replenishing water pump 520 to activate, and hence replace water that has been used in the process of the hydrogen generation, particularly due to fluid losses resulting from thermal and condensation/evaporation processes within the MRA 100 and MRCCA 200.

In one embodiment, an adaptation for employing the hydrogen gas that has been generated is by way of a hydrogen consumption device 2000 for use as a catalyst fuel source for an automobile. FIG. 13 is a block diagram illustrating the electrical control circuitry 300 used to power and control the MRA 100 and MRCCA 200 for on board hydrogen gas generation in a dosed loop fashion. The MRA 100 is designed to be as small as possible, thus minimizing the water required to operate, which in turn likewise optimizes real estate considerations in a hydrogen consumption device 2000. Furthermore, this allows the MRA 100 to approach optimal operating conditions (i.e., temperature and/or ionization levels within the fluid) rapidly. In one embodiment, an optimal water level in the MRA 100 should be about 1 inch above the proximal end (or top) of the MRCCA 200, and the water level within the MRCCA 200 should be about ±0.25 inches below the proximal end (or top) of the MRA 100.

The bottom of the MRCCA 200 needs to be approximately 0.5 inches above the distal end (or inner bottom) of the MRA 100. The proximal and distal core container skirts 180 and 185 provide a loose seal to the bottom of the MRA 100 and the bottom of the MRA 100 inner chamber, hence preventing direct circulation out of the top of the MRA 100, and back downwards between the inner chamber of the MRA 100 and the exterior of the MRCCA 200 (refer also to FIG. 2 and note arrows).

In operation, this forces the fluid up and out of the top of the MRA 100 via exit aperture 125, along the FFCM 190, and hence down into the MRCAA 200 toward the distal end and out of exiting aperture 235 and back toward the MRA 100 via the FFCM 190. This forced circulation is powered by the forming gas bubbles being produced within the MRA 100. Once the hydrogen generation system 1000 is powered up (i.e., the throttle 320 is turned to full-on), and the temperature and amperage draw rises to the maximum operating levels, this process balances and begins and continues.

One embodiment of the control circuitry 300 is shown in the schematic illustration of FIG. 13 in view of a particular adaptation for the hydrogen generation system 1000. Since the emphasis of this disclosure lies in the novel features of the overall hydrogen generation system 1000 with particular emphasis on the MRA 100 and MRCAA 200, and their cooperative, operative relationship there between, the embodiment of FIG. 13 is understood to be one exemplary adaptation of the usage of the hydrogen generation system 1000 for use with a hydrogen consumption device 2000, which in this instant is an automobile.

The control unit 310 manipulates the frequencies, voltage, pulse width and amperage to produce an adjustable pulse modulated, variable frequency voltage signal to the MOSFET array 330. The MOSFET array 330 may comprise a plurality of MOSFETS which supplies the significant power to the contact electrodes 110 and 115 of the MRA 100. In one embodiment, the positive supply from the power source 2020 (i.e., battery) is electrically coupled to the outer RCC 153, and the negative supply from the MOSFET array 330 is electrically coupled to the inner RCC 155.

This embodiment illustrates the nature of the hydrogen on demand nature of the instant invention and how it can be employed as and on-board production of hydrogen gas with non-electrolyzed water. In this adaptation, the hydrogen consumption device 2000 is powered up via the ignition switch 2010 of an automobile, which then completes the circuit for power by way of battery power source 2020. Hence, the essential steps as outlined in the hydrogen gas generation method 900 (of FIG. 12) commence and the hydrogen gas produced may be used as a fuel and catalyst source in the combustion engine of an automobile. However, the water replenishing means 500 may comprise further adapted parts for a vehicle using pre-existing auto parts such as an air conditioning system. In one example, the FSM 250 can be operatively coupled to both the control circuitry 300 and water replenishing means elements such as a water pump 520 for replenishing system water levels. And further, a water reservoir 525 and catch basin 540 may be operatively coupled to a residual water source such as the air conditioning cooling means 550. In an adaptation as such, many existing engine controls and air conditioning cooling system elements that are customarily a part of conventional automobiles are utilized in such an embodiment.

In experimental instances with the present invention, it has been observed that this system may be voltage driven as well. For example, in one instance, applying a 24 V DC power sources, in lieu of a 12 V DC, produces nearly instantaneous, vigorous production of hydrogen gas. Being voltage driven, as opposed to amperage driven, is a major finding in the design of this hydrogen generation system 1000 and for hydrogen gas production, in general. Moreover, this is heavily dependent upon the design, materials, and construction of the MRA 100 in conjunction with the MRCAA 200, versus any particulars of the control circuitry 300.

In the foregoing manner, exemplary embodiments of the present disclosure are described with reference to the figures. Although only exemplary embodiments are of the present disclosure are described, the present invention is not to be limited to specific details so described. The scope of the present disclosure is not limited to the exemplary embodiments of the present disclosure provided above. Numerous changes and modifications can be made to the exemplary embodiments without departing from the scope or spirit of the present invention.

For example, the body casing 210 of the MRCCA 200 is illustrated in a cylindrical fashion, however it is to be appreciated that other shapes are well within the scope of the invention. Similarly, the set of proximal and distal core plates 120 and 130 and set of proximal and distal core plates 120 and 130 of the MRA 100 may likewise be formed of in a shape different from the cylindrical shape illustrated herein.

Furthermore, the embodiments of the disclosed invention may also be adapted into a pressurized modality. In a pressurized embodiment (not shown) operating under the same principals and controls, the hydrogen generation system 1000 produces pressures exceeding 80 psi. The MRA 100 housing is constructed of an approximate 3 inch stainless steel tubing and the proximal and distal core end plates 120 and 130, respectively, may be comprised of be an estimated 1 inch thick polycarbonate blocks. The stainless steel housing would then be sealed to the end plates via a high temperature gasket sealing compound.

Figure 14:
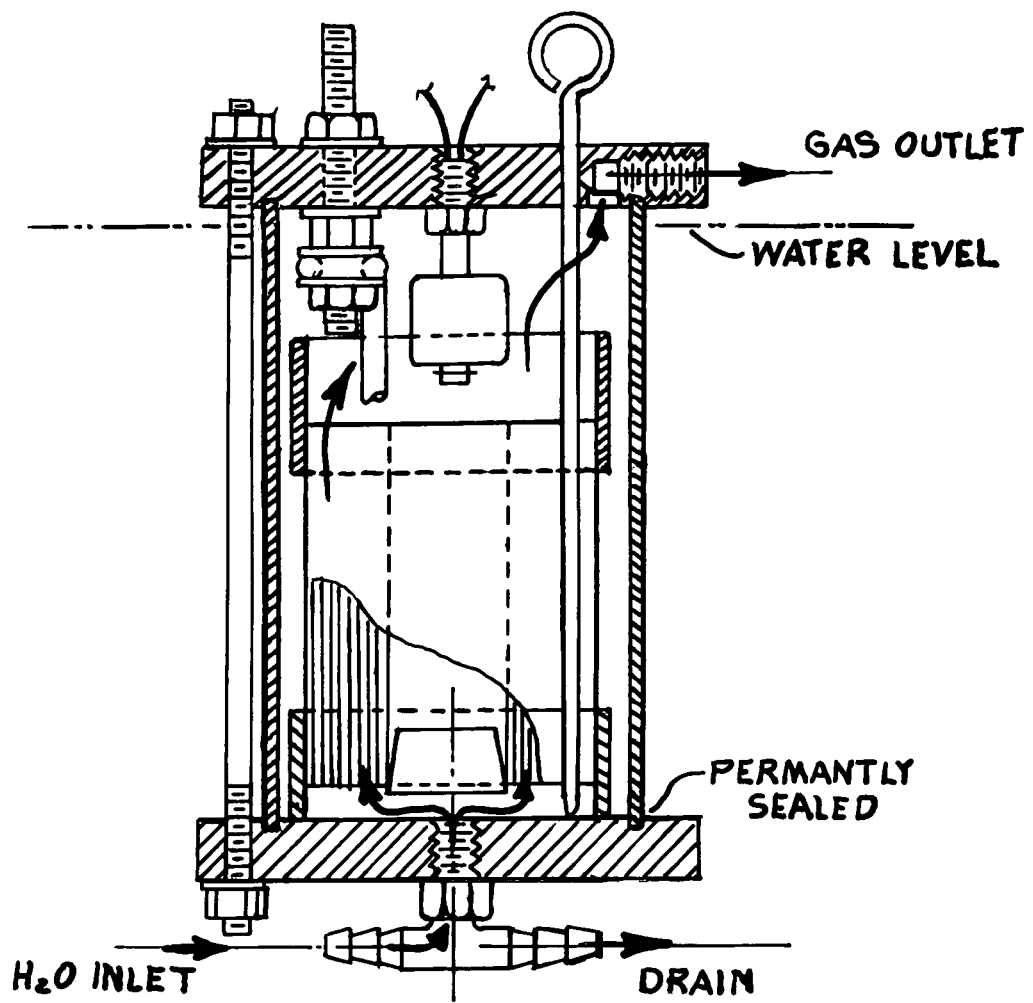
FIG. 14 illustrates an alternate embodiment of a Unitary Molecular Reactor and Control Apparatus (UMRCA) comprising localized fluid level control and temperature control, according to certain embodiments of the present invention.

Herein, the end plates 120 and 130 may be bolted, clamped, or otherwise connected to one another (FIG. 14). Electrical conductors 110 and 115 for an embodiment as such may also be comprised of stainless steel threaded rods which are drilled and tapped into the proximal end plate 120, this maintaining position thereof when in operation and under great pressure. The FSM 250 may have a 0.5 inch range of control, and the water levels contained within the MRA 100 and MRCCA 200 A pressurized system offers hydrogen gas storage capacity for a variety of other types of hydrogen gas usage.

In yet another alternate embodiment, the MRA 100 and MRCAA 200 may be combined in a Unitary Molecular Reactor and Control Apparatus (UMRCA) 1200, as illustrated in FIG. 14. The elements of the UMRCA 1200 are congruently similar to the former embodiments and may comprise the following non-exhaustive listing of:

a core container 1270, a float switch mechanism 1250 and proximal and distal end plates 1220 and 1230 with distal exit apertures 1235 and proximal end plate apertures 1227*a* and 1227*b* (for fluid and hydrogen gas flow), fluid flow conduit means and apparatus 1290, and all of the reactive core conductor windings and parts that comprise the corresponding MRA 100.

Further examples obvious substitutions that would be well known to an artisan of skill in the art such as substituting one form of sealing means for another, or one form of element fastening or attaching means to another. This would also include varying the dimensions of the parts to produce the same device on larger and/or smaller scales. It is further not beyond the scope of the invention to modify and/or substitute known, or even unknown, material equivalents for the conductive components and contacts, and non-conductive components and tubing, and the like. Again, numerous changes and modifications can be made to the exemplary embodiments and their elements without departing from the scope or spirit of the present invention.

What I claim for Letters Patent is:

1. A molecular reactor core and control apparatus comprising:
   a molecular core assembly and
   a molecular control apparatus;
      said molecular core assembly and said molecular control apparatus mechanically and fluidly operatively coupled to one another, and each having a set of a first and second non-electrically conductive end plates;
   and said molecular control apparatus comprising a hermetically sealed non-electrically conductive housing containing
      a float valve mechanism
      and a set of coupling apertures wherein each of said apertures is adapted for mechanically coupling to a fluid flow conduit means,
      said fluid flow conduit means coupling said molecular core assembly to said molecular control apparatus and being external to said sets of end plates;
   said molecular core assembly having:
      a hermetically sealed non-electrically conductive outer housing having a circumferential diameter,
      said outer housing of said molecular core assembly having two sets of coupling apertures, and
      wherein each of said apertures from said first set is adapted for mechanically coupling to said fluid flow conduit means;
      and wherein each of said apertures from said second set is adapted for providing electrical coupling means;
   a hollow, cylindrical, fluid skirt located concentrically within said housing of said molecular core assembly, concentrically surrounding an electrically conductive reactor core, and wherein one set of said first and second end plates is connected to a proximal and distal end of said housing of said molecular core assembly, thus forming the hermetic sealing, said skirt configured and adapted to enable unidirectional upward fluid flow within said housing; said electrically conductive reactor core comprising a set of inner and outer conductive plate windings wherein said plate windings each forming an anode and a cathode and having a circumferential diameter almost equal to the diameter of the fluid skirt such that said windings occlude substantially the entirety of the fluid skirt interior area; and
   a set of contact electrodes electrically coupled to said electrically conductive reactor core and configured and adapted to electrically couple to a power source through said second set of apertures; and
   wherein said inner and outer conductive plate windings spatially located with relationship to one another such that they are concentrically wound about one another and closely wrapped and insulated from one another as continuous, spirally wound coil plates; and
   said concentrically wound conductive plate windings containing an interior circular portion; and
   wherein each of said inner and outer conductive plate windings having an outer most exterior portion comprising electrical contacts for coupling said set of contact electrodes to said electrically conductive reactor core.

2. The molecular reactor core apparatus of claim 1,
   wherein said set of contact electrodes are further electrically coupled to an electrical controls circuitry for manipulating frequencies, voltage, pulse width and amperage.

3. The molecular reactor core apparatus of claim 2, wherein the surfaces of said inner and outer conductive plate windings are roughened surfaces and comprised of 316L grade stainless steel.

4. The molecular reactor core apparatus of claim 2, wherein said float valve mechanism comprises a float device electrically coupled to said electrical controls circuitry.

5. The molecular reactor core apparatus of claim 4, wherein said power source is a direct current power source.

6. The molecular reactor core apparatus of claim 1, wherein said molecular core assembly further comprises an inner core plug located betwixt said set of inner and outer conductive plate windings and adapted and configured to prevent recirculation of fluid within said housing of said molecular core assembly forcing circulation upward through said set of core windings: and wherein said inner core plug is located betwixt said set of inner and outer conductive plate windings within said interior circular portion and wherein said interior circular portion and said inner core plug have equal diameters such that said inner core plug prevents recirculation of fluid within said housing thereby forcing fluid flow through the concentric windings of said set of conductive plate windings.

7. The molecular reactor core apparatus of claim 6, wherein said contact electrodes are comprised of copper.

* * * * *